Patented July 31, 1928.

1,678,980

UNITED STATES PATENT OFFICE.

JOHN B. W. GARDINER, OF NEW YORK, N. Y.

PROTECTIVE COATING FOR METAL AND THE LIKE.

No Drawing. Application filed October 12, 1926. Serial No. 141,241.

The present invention relates to a protective coating primarily intended for application to metal, but which may also be applied to wood, masonry or other types of surface. The coating consists of a layer of asphalt and a layer of cement intimately united to the asphalt. The coating is applied by first covering the surface with a thin layer of bituminous emulsion, which is a material now well known in the trade, and then dusting the surface so that it is thoroughly covered with a dry, powdered form of cement which sets by the action of water. The cement is moistened by the water contained in the emulsion and tends to draw some of this moisture out of the emulsion, thereby reducing the time within which the emulsion must be permitted to dry. Inasmuch as the surface coating and the emulsion are setting simultaneously, and inasmuch as the cement is drawing its moisture from the emulsion, the two become very intimately united, so that if one tries to break up the cement coating, it can only be done by breaking away portions of the under coating of asphalt.

The emulsion may be a form of water emulsion of bituminous material, such as the emulsions now on the market formed with the aid of clay as an emulsifying agent, or other similar forms of emulsion may be used. By the word "similar" I do not intend to limit myself to emulsions which are in all respects identical with clay emulsions, but for the purposes of this invention, emulsions may be divided into two classes or types, a differentiation between these classes being illustrated by the effect on them of a hydraulic cement rather than by the manner in which they are made or the agent through which the emulsification is accomplished. One class consists of those emulsions which, when a hydraulic cement is applied, dry, to the surface forms immediately a surface skin which imprisons the water and prevents it from passing into and hydrating the cement. This class of emulsions is illustrated by the usual soap emulsions. The other class consists of that type in which the water will flow out into the cement before any such skin or "set" of the emulsion occurs, as is the case with clay emulsions. It is this latter class of emulsions to which this invention is applicable.

The emulsion is applied by dipping, spraying or painting the surface, and may be made of any desired thickness, as for example $\frac{1}{16}''$ thick. Soon after the emulsion is applied, its surface is covered with a dry powdered cement, which may be applied by sifting or by an air blower. The thickness of the powder need only be enough thoroughly to cover the asphalt.

The cement covering not only helps to harden the asphalt surface rapidly, but protects it from abrasion and protects it from the composition in the sunlight. It also makes it possible to stack up and handle articles which have been covered. For example, I find that this invention is particularly applicable to gas pipes which can be coated and then shipped without the coatings sticking together. Due to the fact that the two layers have hardened at the same time, they will be intimately united and the cement will not crack off from the elastic base.

The cement may be any one of many types, and I intend to embrace within this term various materials such as Portland cement, magnesite cement, gypsum plaster, lime and the like. The type of cement selected may vary with the field of application.

While my invention is primarily intended as a coating for metals and the like, there may be other cases where it is desirable to cover asphalt with an integrally united protective coating.

What I claim is:

1. The method of coating materials which comprises the steps of applying to a material a coating of an emulsion of a bituminous material dispersed in water, of the type in which clay is used as the emulsifying agent, and applying dry cement to the surface of such coating while the emulsion is still wet, whereby the cement is hydrated by the water of the emulsion to form a protective coating therefor, and the surfaces of the two materials are caused to intimately unite and cohere.

2. The method of coating materials which comprises the steps of applying to the surface of a material a layer of bituminous emulsion formed without the use of soap and covering such bituminous emulsion with a layer of dry cement while the emulsion is still wet, whereby water is drawn from the emulsion and the cement is hydrated to form a protective coating for the bituminous material and the surface of the bituminous material and the cement are caused to intimately unite and cohere.

3. As a new product, a base, a coating thereon of hardened bituminous emulsion of the type in which clay had been used as the emulsifying agent, a distinct cement coating covering the bituminous material cohering directly thereto without a plane of cleavage between the two coatings, said cement coating and said bituminous coating being held together by the direct interlocking of the two coatings independent of any intermediate granular material.

4. A product as specified in claim 3, in which said base is metal.

JOHN B. W. GARDINER.

CERTIFICATE OF CORRECTION.

Patent No. 1,678,980.  Granted July 31, 1928, to

JOHN B. W. GARDINER.

It is hereby certified that error appears in the printed specification of the above numbered patent requiring correction as follows: Page 1, lines 65 and 66, for the words "the composition" read "decomposition"; and that the said Letters Patent should be read with this correction therein that the same may conform to the record of the case in the Patent Office.

Signed and sealed this 2nd day of October, A. D. 1928.

(Seal).

M. J. Moore,
Acting Commissioner of Patents.